May 23, 1967 H. G. NISSEN ETAL 3,320,873
HEATING AND ROASTING DEVICES, WITH SYSTEM
FOR COLLECTION OF GREASE DRIPPINGS
Filed Dec. 6, 1965

INVENTORS,
Hans G. Nissen &
Alexander I. Martin,
BY
ATTORNEY.

United States Patent Office 3,320,873
Patented May 23, 1967

3,320,873
HEATING AND ROASTING DEVICES, WITH SYSTEM FOR COLLECTION OF GREASE DRIPPINGS
Hans G. Nissen and Alexander I. Martin, both of 35 Relda St., Plainview, N.Y. 11803
Filed Dec. 6, 1965, Ser. No. 511,839
12 Claims. (Cl. 99—423)

The present invention relates to devices for heating and roasting frankfurters, sausages and other substantially cylindrical food items which are placed for rotation on and along two adjacent rollers of a series of closely spaced, heated and rotated parallel rollers positioned alongside one another in a general horizontal plane over a base casing under said rollers, housing motor means; the ends of said rollers extending into end casings through bearings in the end casing walls; such end casings forming the general frame structure in connection with the base casing, and housing the transmission drives from the motor means to said rollers, and the connections to the electrical heaters contained in said rollers. More particularly, this invention concerns means for collecting the grease dripping from said rollers.

A device of this class of roller grills is shown in our previous invention set forth in Patent No. 3,084,616 which provides a drip pan removably positioned atop the base casing and extending beneath the rollers substantially the entire distance between the end casings, with drip fins substantially horizontally across the exposed facing walls of the end casings, between the rollers and said pan. This provided for the collection of grease dripping from the rollers along their exposed length, but appreciable seepage occurred into the end casings, which became trapped therein, accumulated and hardened, thereby not only interferring with moving parts, but soon emitted foul odors. End covers had to be removed and cleaning was not easy.

It is therefore the principal object of this invention to provide novel and improved contruction in heating and roasting devices of the character described, affording structure which compels grease dripping anywhere from the rollers, including that which enters the end casings, to collect in the accessible drip pan positioned between said end casings.

Another object thereof is to provide a novel and improved grease-collecting system having the mentioned attributes, which is very simple in structure, very low in cost, and which is efficient in carrying out the purpose for which it is designed.

Other objects and advantages will become apparent as this discloser proceeds.

For one practice of this invention, employing it in a heating and roasting device of the construction described where the roller ends extend into the end casings, we provide a hole through each of the roller-supporting walls, a bit below the rollers and of course, above the drip pan. On the inner surface of each of said roller-supporting walls, below all roller surface within the end casings, there is a gutter which discharges through the related hole. On the outer surface of each of said roller-supporting walls, below the rollers and the related hole, and extending over the drip pan, there is a drip fin slanting downwardly towards the pan, or else another gutter communicative with said related hole, with a discharge spout directing its flow into said pan. Said roller-supporting walls, the gutters and fins, shall be of heat-conductive material, as sheet or cast metal, so the heat generated in the device will keep all grease in contact therewith in a molten state so it can run off into the drip pan.

In the accompanying drawing forming part of this specification, similar characters of reference indicate corresponding parts in all the views.

Figure 1:
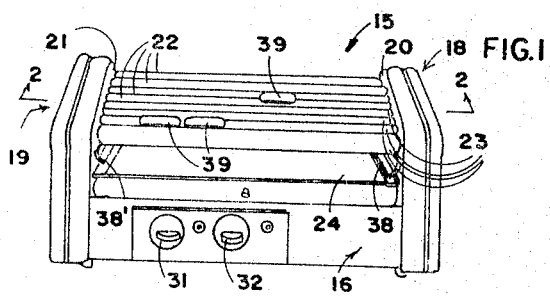
FIG. 1 is a pictorial view of a heating and roasting device embodying the teachings of this invention.
Figure 2:
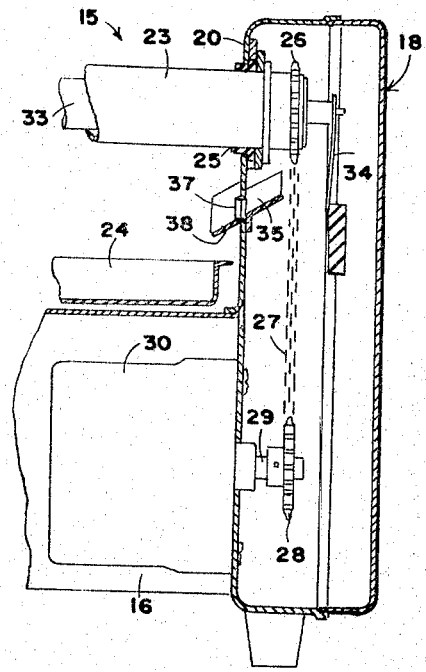
FIG. 2 is an enlarged section taken at line 2—2 in FIG. 1.
Figure 3:
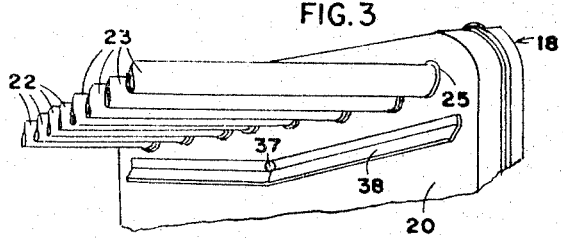
FIG. 3 is an enlarged fragmentary pictorial view of one end portion of said device, looking at the outer surface of the roller-supporting wall which is here included.
Figure 4:
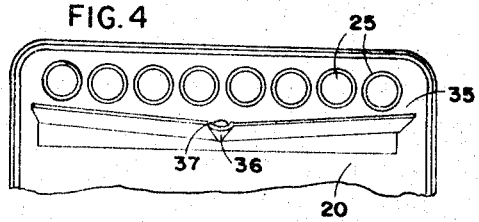
FIG. 4 is a view looking directly onto the inner surface of a roller-supporting wall; various details being omitted to attain clarity of illustration, but particularly shown are the roller supports and the grease-collecting and guiding gutter which is within an end casing.
Figures 5, 6, 7:
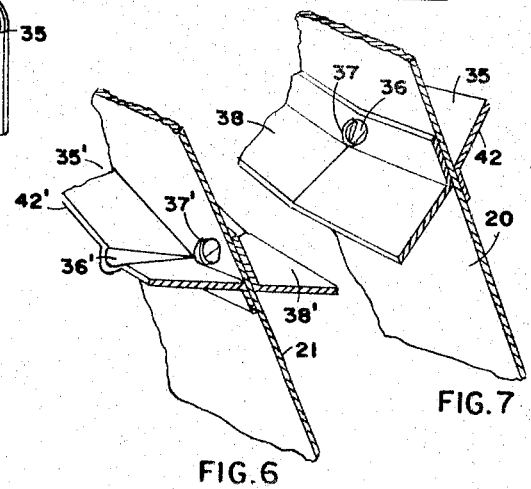
FIG. 5 is a diagrammatic view showing a scheme for driving half the total number of rollers.
FIG. 6 is an enlarged fragmentary perspective view showing one of the roller-supporting walls and its associated grease-collecting and guiding means.
FIG. 7 is an enlarged fragmentary perspective view showing the other roller-supporting wall and its associated grease-collecting and guiding means.

In the drawing, the numeral 15 designates generally a heating and roasting device whose framework in the embodiment illustrated is an upright U-shaped casing structure which is made up of a low, horizontal, elongated base casing denoted by the numeral 16, joined to comparatively tall identical end casings indicated generally by the numerals 18 and 19 respectively. The two facing walls 20 and 21 of said end casings rotatably support a series of identical rollers 22 and 23, which are spanned between them in parallel and slightly spaced relation, over a drip pan 24, removably set to rest above the base casing 16. The ends of said rollers extend into said end casings 18 and 19. Teflon bushings like 25, line openings in said end casing walls 20 and 21, to serve as bearings for the respective rollers. In the end casing 18 each of the rollers 22 has a sprocket 26 thereon. In the end casing 19 each of the rollers 23 has a similar sprocket, not shown. All sprockets are spaced, and each group is driven by a common endless chain from a sprocket on a motor shaft, as shown in FIG. 5, where the sprockets 26 are connected by the chain belt 27 to the sprocket 28 on the shaft 29 of the motor 30. Similar provision is made in the end casing 18 for the group of rollers 23, which is driven by another motor not shown. Both motors are housed in the base casing 16, which presents a switch 31 to control motor operation, and a switch 32 to control the heating system which includes heating units like 33, carried within the rollers respectively, and suitably associated with supports and current terminals as 34. Since this invention is concerned with the collection of grease dripping from the rollers, it is believed that further details of the device are unnecessary, for which reference can be had to said patent, and so we will now proceed to set forth the grease collecting means.

Figure 8:
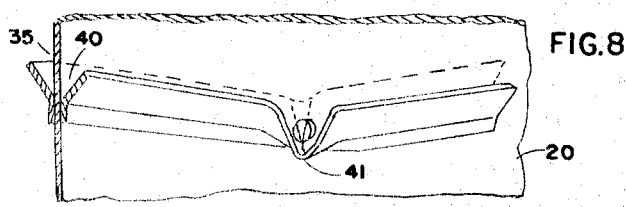
FIG. 8 is an enlarged fragmentary view like FIG. 7, but showing a slightly modified construction.

On the inner surface of the wall 20, meaning that surface thereof which is within the end casing 18, there is a gutter 35 a little below all roller ends, to receive any grease dripping down from wall surface or from the roller ends. This gutter 35 is preferably a very shallow V-shape, so grease coming into it, will flow down both its arms into a traverse sluice 36, which discharges all gutter contents through an opening 37 in said wall, onto a fin 38 which is on the outer surface of said wall, under all the rollers 22, 23, and slanting downwardly towards the drip pan 24. It is evident that all grease coming onto the rollers 22, 23, while sausages 39 are being roasted, will drip into the pan 24. The opening or hole 37 should be large enough to assure a free flow from the trough or gutter 35 and be so positioned that all liquid in said gutter shall be drained therethrough. Hence, said hole commences at the very bottom of said gutter. In the modified construction shown in FIG. 8, instead of the fin 38, there is a trough or gutter 40, formed with a central spilling spout 41 which discharges into the dripping pan 24. In all instances, the grease-directing structure provided on the wall 20, is duplicated on the wall 21, where the parts corresponding in FIG. 6, to those in FIG. 7, are given the same numerical designations, but primed.

In the preferred sheet metal casing structure here shown, the end casings include the removable cover members 18', 19' respectively. The fins 38, 38' are provided by forming them of obtuse angle pieces of sheet metal. The wall 20 provided with the fin 42, forms the gutter 35. All the other gutters mentioned, are likewise formed by use of obtuse angle pieces. All such pieces are mounted by welding or other suitable way onto the walls where they belong, and preferably, their junctures with said walls are caulked with a suitable heat-resistant sealant, not shown. The vertical leaves of the fins 38, 38' add thickness to the wall they are on respectively, and shall be deemed part thereof, for the draining openings 37, 37' are through such leaves which have become part of the wall structure. The casing structure may of course, be made so that the walls 20, 21 shall be cast with their associated fins integral therewith, which is readily understood without further illustration. For practical, economical and suitable construction, the casings, drip pan and the obtuse angle pieces, are all of aluminum stampings, and the rollers are of steel tubing, preferably coated first with nickel and then chromium-plated.

This invention is capable of numerous forms and various applications without departing from the essential features herein disclosed. It is therefore intended and desired that the embodiments shown herein shall be deemed merely illustrative and not restrictive and that the patent shall cover all patentable novelty herein set forth; reference being had to the following claims rather than to the specific showings and description herein, to indicate the scope of this invention.

We claim:
1. In a heating and roasting device of the type having a plurality of horizontally positioned, slightly spaced parallel rollers housing heating elements and spanning opposite, spaced, upright first and second walls supporting said rollers in holes therethrough, for rotation over a drip pan extending between said walls; the improvement being means for guiding into the drip pan, grease dripping from said rollers onto and near both surfaces of both said walls, comprising first, second, third and fourth members to receive grease dripping from said rollers and wall surfaces; the first member being on that surface of the first wall which faces the second wall, and arranged to lead grease coming thereon, to fall into said drip pan; the second member being a gutter on the other surface of the first wall; said first wall having a first opening through which grease coming into said gutter, will drain out of, means leading from said first hole, to guide the discharge from said first hole, to drop into said drip pan; the third member being on that surface of the second wall which faces the first wall, and arranged to lead grease coming thereon, to fall into said drip pan; the fourth member being a gutter on the other surface of the second wall; said second wall having a second opening through which grease coming into said gutter which is the fourth member, will drain out of, and means leading from said second hole, to guide the discharge from said second hole, to drop into said drip pan; all said members being under the rollers, extending from a wall surface respectively, and positioned above the plane of the mouth of the drip pan, into which all drippings eventually enter, when said rollers, walls and members are in hot condition sufficient to maintain the grease in molten state.

2. A device as defined in claim 1, wherein each of the gutters is lengthwise, a shallow, upright V-shape; each of said openings being at the junction of the arms of said V-shape.

3. A device as defined in claim 1, wherein each of said gutters is formed by a fin extending from said walls respectively to form a gutter structure therewith.

4. A device as defined in claim 1, wherein each of the first and third members is a fin, slanting downwardly towards the drip pan, and is lengthwise in the form of a shallow, upright V-shape; each of said openings being between the arms of said V-shapes respectively.

5. A device as defined in claim 1, wherein each of the first and third members is a gutter which lengthwise, is in the form of a shallow, upright V-shape, including a spout at the junctions of the arms of said V-shapes respectively; each spout being arranged to spill into the drip pan; each of said openings being between the arms of said V-shaped members respectively.

6. A device as defined in claim 5, wherein each of said gutters is formed by a fin extending from said walls respectively to form a gutter structure therewith.

7. A device as defined in claim 1, wherein said members and said openings are so positioned on the respective walls that the discharges from said gutters through said respective openings are onto the first and third members respectively; said first and third members respectively serving as the means leading from said openings to guide said discharges into the drip pan.

8. A device as defined in claim 7, wherein each of the gutters is lengthwise, a shallow, upright V-shape; each of said openings being at the junction of the arms of said V-shape.

9. A device as defined in claim 7, wherein each of said gutters is formed by a fin extending from said walls respectively to form a gutter structure therewith.

10. A device as defined in claim 7, wherein each of the first and third members is a fin, slanting downwardly towards the drip pan, and is lengthwise in the form of a shallow, upright V-shape; each of said openings being between the arms of said V-shapes respectively.

11. A device as defined in claim 7, wherein each of the first and third members is a gutter which lengthwise, is in the form of a shallow, upright V-shape, including a spout at the junctions of the arms of said V-shapes respectively; each spout being arranged to spill into the drip pan; each of said openings being between the arms of said V-shaped members respectively.

12. A device as defined in claim 11, wherein each of said gutters is formed by a fin extending from said walls respectively to form a gutter structure therewith.

References Cited by the Examiner

UNITED STATES PATENTS

| | | | |
|---|---|---|---|
| 2,259,073 | 10/1941 | McGlaughlin | 99—427 |
| 2,697,395 | 12/1954 | Steriss | 99—423 |
| 2,867,165 | 1/1959 | Money | 99—446 |
| 3,084,616 | 4/1963 | Nissen et al. | 99—423 |
| 3,225,682 | 12/1965 | Savio | 99—446 |
| 3,238,863 | 3/1966 | Beasley et al. | 99—446 |

WALTER A. SCHEEL, *Primary Examiner.*

A. O. HENDERSON, *Assistant Examiner.*